Oct. 14, 1924.  
W. O. RUNCIE  
1,512,010

TRANSPARENCY POSSESSING STEREOSCOPIC RELIEF AND METHOD OF MAKING IT

Original Filed May 24, 1918

TRANSPARENT.

TRANSPARENT.

INVENTOR  
Walter Osborne Runcie.  
BY  
ATTORNEYS.

Patented Oct. 14, 1924.

1,512,010

UNITED STATES PATENT OFFICE.

WALTER OSBORNE RUNCIE, OF WENONAH, NEW JERSEY.

TRANSPARENCY POSSESSING STEREOSCOPIC RELIEF AND METHOD OF MAKING IT.

Original application filed May 24, 1918, Serial No. 236,423. Divided and this application filed May 3, 1919, Serial No. 294,606. Renewed March 22, 1924.

*To all whom it may concern:*

Be it known that I, WALTER OSBORNE RUNCIE, a citizen of the United States, residing in Wenonah, county of Gloucester, and State of New Jersey, have invented a new and useful Transparency Possessing Stereoscopic Relief and Method of Making It, of which the following is a specification.

My present invention comprehends a composite picture mounted on a transparent support possessing stereoscopic relief so that when viewed by an observer by transmitted light the objects of the picture without the aid of intermediate optical means appear in natural relief and apparent solidity as seen in a stereoscope.

In a co-pending application Serial No. 236,423, filed May 24th, 1918, I have described and generically claimed a novel method of producing and exhibiting pictures possessing stereoscopic relief and my present application which is a division of my parent application aforesaid, relates more particularly to a picture possessing stereoscopic relief and which has a transparent background.

A properly corrected photographic objective lens produces at its focus an aerial image or model of the subject to which it is directed. This aerial image is an exact replica of the original subject, the various points in the image being exactly proportional to corresponding points in the subject and their distances from each other are also proportional. From the foregoing, it is clear that the aerial image possesses three dimensions corresponding to the original subject, on a scale determined by the equivalent focus of the lens and the distance from camera to subject.

In accordance with my invention the aerial image produced by the lens at its focus is systematically analyzed or progressively divided into a plurality of vertical parallel planes at right angles to its axis. The analytic planes of the image are systematically superimposed in spaced relationship in accordance with the laws of optical reversibility. By fulfilling these conditions the resultant picture appears to possess stereoscopic relief because the eyes are called upon to exert their natural power of axial and focal accommodations thereby fulfilling the conditions required for binocular vision.

The ground glass in the camera shows only that section of the aerial image which accords with the position in which it is placed by the focus of the lens.

By the progressive variation of distance of the ground glass along the axis of the lens the picture on the ground glass varies in size and its different portions corresponding to various distances in the subject vary in definition. The values of variations in definition increase or decrease with the focal length and relative aperture of the lens. The distribution of the sharpness of the picture for a certain position of the ground glass in the focus of the lens obeys the laws of conjugate foci, and the diameter of the circle of confusion given by a point in the subject is determined by the same law.

For the purpose of illustrating my invention, I have shown in the accompanying drawing embodiments thereof which are at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts.

Figure 1:
Figure 1 represents diagrammatically an element in a transparency wherein the background is in focus and the foreground is out of focus.

Referring to the drawings.

Figure 2:
Figure 2 represents an element in transparency wherein the foreground is in focus and the background is out of focus.
Figure 3:
Figure 3 represents a composite picture with the elements thereof in spaced relationship.

In Figure 1 of the drawings, I have shown an element 1 of the picture in which the background is in focus and the foreground is out of focus while in the element 2 seen in Figure 2 the foreground is in focus and the background is out of focus. The elements 1 and 2 are each transparent prints. These two prints are assembled in register with a spacing element 3 between them and secured together in any desired manner to form a composite picture embodying my invention.

It is to be understood at the outset that any desired number of plane images of the subject may be formed and assembled in spaced relationship to produce stereoscopic relief but for simplicity of description we can consider the subject as analyzed into but two planes, a foreground and a background plane. The negatives may be made by the use of an ordinary camera which is placed on a tripod or other support. I then focus on the foreground plane of the subject to make an exposure with a large lens aperture. This gives one a record of the subject wherein the foreground is in focus and the background is out of focus. I then change the focus of the lens without moving the position of the camera so that the objects in the background will be rendered sharp and will be in focus. I then make a second exposure. On development, I obtain two negatives the images of which are unequal in size due to the distance the lens is shifted between the exposures. The foreground plane image is larger than the background plane image and it is most convenient to enlarge the background image to correspond to the size of the foreground image. The two images are then brought into register with sufficient separation between them to produce the desired stereoscopic relief. Theoretically the separation should be equal to the distance the lens was shifted between the exposures but in practice a much less separation is necessary to give the desired effect. In order to produce a picture, one which can be viewed by reflected light, the back ground image is preferably enlarged on a film or a sheet of transparent flexible material and a sheet of transparent flexible material like gelatine or celluloid is inserted between the foreground image and the background image to effect the separation. The foreground image is preferably printed on a film. The two images are superimposed and bound or cemented together in any desired manner to complete the composite picture.

Each analytic image will appear out of focus in certain portions when viewed single but this out of focus effect will entirely disappear when the composite or synthetic result is viewed. If the ordinary camera is employed fitted with a ground glass for focusing and successive exposures are to be taken, I proceed as follows:—

I first set up the camera on a tripod or other film support and focus on the background plane of the subject using a large diaphragm opening in the lens to render the foreground plane of the subject out of focus. The plate or film holder is then inserted and a correct exposure made. The plate or film holder is now removed and without changing the position of the camera, I focus on the foreground plane of the subject, the diaphragm being set to the same opening as in the first instance. The plate or film holder is again inserted and another exposure is made on a separate plate or film. The two plates or films are then developed and this produces one negative in which the foreground is sharp and in focus, while the background is out of focus. The other negative has the background sharp and in focus, while the foreground is out of focus. The background plane image will be smaller than the foreground plane image due to the decrease in distance between the lens or plate or film and the consequent increase of angle of view. The background plane image must be brought to the same size as the foreground plane image, or vice versa. This can be accomplished by enlargement or reduction, i. e. the background image can be enlarged to the same size as the foreground image, or the foreground image can be reduced to the same size as the background image. It is preferable, however, to enlarge the background image. In order to make a composite print to be viewed by reflected light, I make an enlargement on a transparent flexible support such as a celluloid film or carbon tissue from the background plane negative image to correspond to the foreground negative plane. I then make a contact print on composite celluloid film or carbon tissue from the foreground negative image. A sheet of transparent flexible material such as gelatine or celluloid of suitable thickness is inserted between the background image-bearing support and the transparent foreground image-bearing support, to effect the necessary separation to produce stereoscopic relief. Both images are then adjusted in proper register and then united together in optical contact. This completes the print in relief.

Several variations of the foregoing are within the scope of my invention, for example, it does not matter in what order the analytic negatives are taken.

Again, the background plane negative image may be printed directly on the transparent support by contact and the foreground plane image can be reduced in size to correspond to the background image.

An enlarged composite print may also be made by enlarging both analytic negatives to any reasonable size. The only condition required is to enlarge both images to the same size for correct superposition.

Any form of sensitized transparent flexible support may serve to support the images indicative of the different analytic planes of the subject.

If a camera is used which is not provided with a ground glass for focusing, the camera is set on a tripod or other rigid support. I then extend the bellows and set the pointer over the scale to the distance corresponding to the plane in the subject it is desired to render sharp to form the background plane image. I then make an exposure. The film is next changed and without moving the camera, I set the pointer on the scale to correspond to the distance of the foreground objects and make another exposure. The preparation of prints from these analytic negatives is identical with the method already described.

*Ordinary equipment with a battery of supplementary lenses.*

An ordinary camera fitted with a ground glass for focusing is set up on a tripod or other rigid support. I then focus on the background plane of the subject using a large diaphragm opening in the lens, insert the plate or film holder and make a correct exposure. The plate or film is then changed and without changing the position of the camera or disturbing the focus of the lens, I select a supplementary lens of proper focal length and place it over the front of the camera lens. This will render the foreground sharp and the background out of focus. I now make another exposure. Both images on development will be of the same size because the lens was not shifted in making the different exposures. The contact prints are then made. The background plane image may be printed directly on the sensitive support and the foreground plane image may be printed on a sensitive transparent flexible support. Both analytic prints are assembled in their correct relation with a transparent flexible separating medium between them and the parts preferably cemented together in optical contact. Both analytic negatives may be enlarged to any desired size and any enlarging method may be employed. The only necessary condition to be fulfilled is that the prints or enlarged records must be of the same size for correct superposition.

*Method using a battery of supplementary lenses with a camera not provided with a ground glass for focusing.*

If the camera is not provided with a ground glass for focusing, it is set up on a tripod or other rigid support, the pointer on the scale is set to the distance corresponding to the background plane and an exposure is made. The film is then changed and without moving the position of the camera, or disturbing the focus of the lens, a supplementary lens of proper focal length is slipped over the camera lens in order to render the foreground plane sharp. Another exposure is now made. The resultant analytic negatives will be of the same size because the distance between the lens and film was not changed in making the different exposures. Contact prints or enlargements as desired are then made and these are superimposed and assembled in register and in spaced relationship.

Instead of printing or enlarging the background plane image on paper or other opaque support, as is the case when the picture is to be viewed by reflected light, the impression is transferred to an emulsion-coated glass plate or other rigid transparent support. The foreground plane image is preferably printed or enlarged on an emulsion-coated glass plate or other rigid transparent support.

The analytic positive images thus obtained are of identical size and are then assembled with a separating frame of cardboard or other suitable material of sufficient thickness between the two image-bearing glasses to effect the necessary separation. The images are then brought into correct register and the composite transparency is bound securely around the edges with binding tape or other means to complete the picture in relief. Colored transparencies and transparencies in natural colors in all forms can be produced in accordance with the foregoing disclosure. In my present application all of the images are mounted on transparent supports while in my co-pending application Serial #294,605 the background image is mounted on an opaque support and the other images are mounted on transparent supports.

It will now be apparent that I have devised a novel and useful construction of a transparency possessing stereoscopic relief which embodies the features of advantage enumerated as desirable in the statement of the invention and the above description, and while I have, in the present instance, shown and described preferred embodiments thereof which will be found in practice to give satisfactory and reliable results, it is to be understood that the same are susceptible of modification in various particulars without departing from the spirit or scope of the invention or sacrificing any of its advantages.

Having thus described my invention what I claim as new and desire to secure by Letters Patent, is:—

1. A transparency comprising a plurality of superimposed parallel analytic photographic images of the subject taken from the same angular viewpoint and assembled in spaced relationship to produce stereoscopic relief, the image indicative of each plane being on a transparent support.

2. A transparency comprising a plurality of superimposed analytic photographic images taken from the same angular viewpoint, each image representing an analytic plane of the subject in its proper focus, a separation spacing the images from each other, the images of different planes being of the same size, and means to secure the images and separation in assembled position.

3. A photographic transparency comprising a plurality of superimposed parallel analytic images of the subject assembled in substantially spaced relationship to produce stereoscopic relief, the analytic images being spaced from each other in accordance with the ratio of the conjugate foci of the lens used in taking them and the image indicative of each plane being on a transparent support.

4. A photographic transparency comprising a plurality of superimposed parallel analytic images of the subject taken from the same angular viewpoint, the objects which are in focus in one image being out of focus on the other image, said images being assembled in spaced relationship to produce stereoscopic relief and each image being on a transparent support.

In testimony that I claim the foregoing as my invention, I hereunto sign my name this tenth day of February, 1919.

WALTER OSBORNE RUNCIE.

Witnesses:
H. S. FAIRBANKS,
C. D. McVAY.